Figure 1:
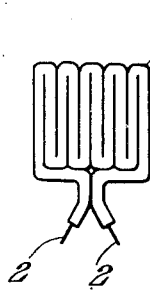
Figure 2:
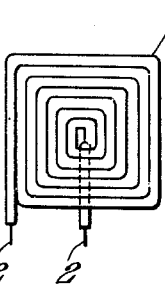
Figure 3:
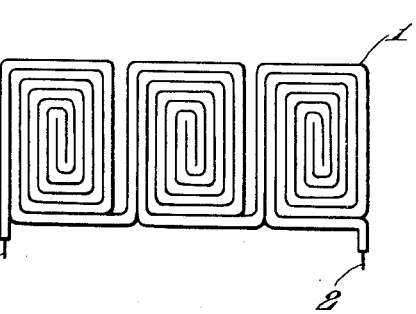
Figure 4:
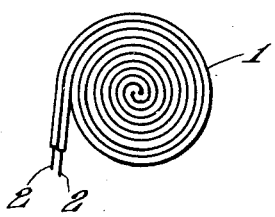

April 18, 1950     J. L. H. JONKER     2,504,335
INDIRECTLY HEATED CATHODE
Filed Aug. 6, 1947

JOHAN LODEWIJK HENDRIK JONKER
INVENTOR.
BY 
AGENT.

Patented Apr. 18, 1950

2,504,335

UNITED STATES PATENT OFFICE 2,504,335

INDIRECTLY HEATED CATHODE

Johan Lodewijk Hendrik Jonker, Eindhoven, Netherlands, assignor to Hartford National Bank and Trust Company, Hartford, Conn., as trustee Application August 6, 1947, Serial No. 766,801
In the Netherlands August 30, 1946

3 Claims. (Cl. 250—27.5)

My invention relates to disc-shaped, indirectly heated cathodes for electric discharge tubes. More particularly, it is concerned with such a cathode embodying a specially formed heating element.

A difficulty arising when heating objects by means of a heater constituted, for example, by a heating wire housed in the object so as to be insulated therefrom and arranged in a zig-zag manner or helically, is that the heat transmission from heater to object is comparatively poor and the thermal losses owing to dissipation and radiation may be great. Since the heating wire is generally embedded in the insulating material, the thermal contents of the assembly are furthermore comparatively high, so that the final temperature of the object cannot be attained until after a comparatively long period of time, unless the heating energy is made unproportionally high. The latter condition, however, introduces the disadvantage that the final temperature becomes excessive. Accordingly, provision is generally made in these cases of an automatic or non-automatic device which permits of temporarily disrupting the heating current, for example in the case of flat irons, boiling kettles and the like.

With cathodes of the indirectly-heated type intermittent disruption of current is undesirable, so that the heating energy must be such that the final temperature assumes the correct value. Consequently, in order to keep the heat inertia low, satisfactory heat transmission from heating element to cathode must be ensured. It is known that the thermal losses of an indirectly-heated cathode can be reduced by forming such a cathode in the shape of a disc. Such a disc-shaped or "pot" cathode is constituted by a metal pot or container, in which the heating wire is arranged in an insulated manner, the flat and disc-shaped bottom being coated with electron-emitting material. A pot-cathode of this kind is frequently used in cathode ray tubes and also in amplifying or rectifying tubes. In these cases the heating wire may be bent in zig-zag manner or may be shaped in the form of a flat spiral which may be bifilar and is baked in insulated material.

However, these pot-cathodes have a disadvantage in that, apart from the aforesaid disadvantage of poor heat transmission from the heater to the emitting surface, the thermal losses owing to dissipation and radiation may be comparatively great, particularly if the cathode exhibits comparatively large dimensions for supplying current strengths wanted for amplifying tubes. Owing to the comparatively large mass of the cathode, the thermal inertia is great, so that heating up takes a comparatively long time, as set out above.

The aforesaid disadvantages can be appreciably reduced if the heater is constituted, according to the invention, by a tubular body in which a heating wire is arranged with the interposition of pulverulent insulating material, said composite body being bent in such manner that a closed surface is formed. The latter is metallically connected by welding or soldering to a thin, disc-shaped, metal plate bearing an electron emitting substance on its opposite side. Use is preferably made of a tubular body which is formed by swaging, drawing or rolling of a tube of larger diameter in which one or more conductors are arranged, the remaining space being filled with pulverulent insulating material.

Due to the drawing process the insulating material is very intensely compressed, and when the desired diameter is reached the insulating layer between the internal conductor(s) and tubular sheath may be very thin. This ensures satisfactory heat transmission from the internal conductor(s) to the tubular sheath. A tubular body of this kind can be readily bent in any desired manner and can be flattened wholly or in part without establishment of contact between the internal conductor(s) and the tubular sheath.

According to the invention such a tubular body is bent in zig-zag or meander fashion or it is wound to form a single or double flat coil in such manner that a substantially closed surface is formed to which is soldered or welded a thin, disc-shaped metal plate bearing an electron emitting substance on its opposite side. The tubular body, after being bent in the above described manner, is preferably slightly flattened prior to the attachment to the metal plate, which permits the surface formed to be very flat. As a whole, this surface may be curved, arcuate or differently shaped.

It has been known per se to make heating elements from compound conductors separated from one another by pulverulent insulating material and made to assume the desired diameter by swaging or drawing. However, such a conductor was not metallically connected to the object required to be heated, but was used as an immersion heater or the like.

Figure 5:
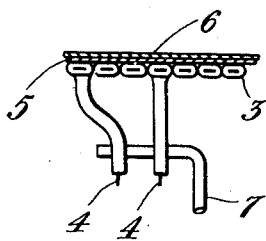
Figure 6:
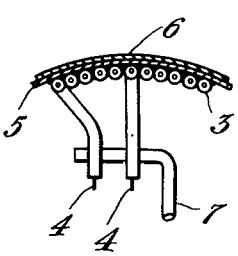
Figure 7:
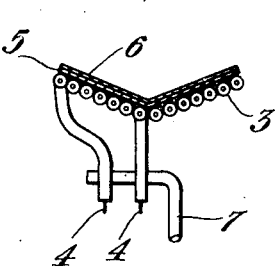
Figure 8:
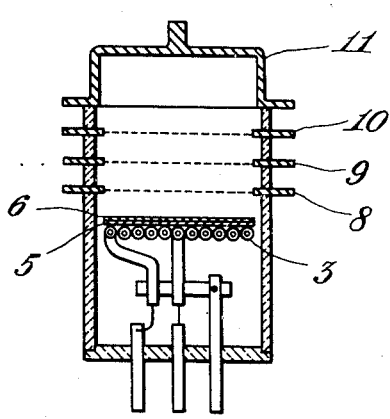

In order that the invention may be more clearly understood and readily carried into effect, it will now be explained more fully with reference to the accompanying drawing, in which:

Figs. 1, 2, 3 and 4 show various ways in which the tubular heater bodies may be arranged according to the invention, Figs. 5, 6 and 7 show cathodes comprising heaters according to the invention and Fig. 8 shows a discharge tube comprising such a cathode.

In Fig. 1, 1 designates a tubular body comprising a heating wire 2 which is insulated from the body 1 by means of pulverulent insulating material, preferably MgO. The body 1 is bent in zig-zag fashion, meander fashion, angularly or spirally, and so forth, thus forming a substantially closed surface to which the electron emitting plate may be soldered or welded. In order that the surface formed by the tubular body 1 may be flatter and contact therewith improved, the element shown in Figs. 1 to 4 may be rolled prior to its attachment to the plate. This is particularly important if the element is secured by welding, since the contact surface between the element and the plate is thus increased. Figs. 5, 6 and 7 show elements of this kind joined to the coated plate. In each case, the element 3 has secured to it by spot-welding a thin nickel plate 5 coated with electron emitting material 6. The thermal energy is supplied by means of a heating wire 4, and the assembly is carried by a supporting rod 7 which also serves as a supply conductor for the cathode 5. As an alternative, the surface formed by the body 1 may be spherical or conical, as shown in Figs. 6 and 7. Fig. 8 shows an electric discharge tube particularly suitable for short waves and comprising a cathode as shown in Fig. 5. Grids 8, 9 and 10 are secured to rings sealed in the tube wall and anode 11 constitutes the top of the bulb. It is obvious that a cathode of the said kind may also be used in tubes of more customary construction, in cathode-ray tubes, and so forth. The heating power of such a cathode may be very small, i. e. from 1 to 2 watts. The tubular body 3 may have a diameter of, say, 100 to 200 microns.

What I claim is:

1. A disc-shaped, indirectly heated cathode for an electric discharge tube comprising a disc-shaped, metal plate bearing on one side an electron emitting substance and metallically connected at its opposite side to a heater composed of a spirally wound aggregate comprising a metallic tubular body enclosing a heating wire insulated therefrom by interposition of firmly compacted powdery electrically insulating material, said tubular body being arranged within substantially a single plane and having adjacent windings in contact with each other, thus forming a substantially closed surface to which the aforesaid plate is connected.

2. An indirectly heated cathode as claimed in claim 1, wherein the tubular body is elliptical in cross section, and the closed surface of the heater is substantially flat.

3. An indirectly heated cathode as claimed in claim 1, wherein the tubular body exerts intense compressive force upon the insulating material therein and has a diameter of from about 100 to about 200 microns.

JOHAN LODEWIJK HENDRIK JONKER.

REFERENCES CITED

The following references are of record in the file of this patent:

UNITED STATES PATENTS

| Number | Name | Date |
|---|---|---|
| 2,038,341 | Bruche | Apr. 21, 1936 |
| 2,226,696 | Clavier et al. | Dec. 31, 1940 |
| 2,263,169 | Evans | Nov. 18, 1941 |
| 2,421,039 | Segerstrom, Jr. | May 27, 1947 |
| 2,436,907 | Trimble | Mar. 2, 1948 |
| 2,445,993 | Beggs | July 27, 1948 |

FOREIGN PATENTS

| Number | Country | Date |
|---|---|---|
| 148,796 | Austria | Mar. 10, 1937 |